(12) United States Patent
Griffin et al.

(10) Patent No.: US 6,585,064 B2
(45) Date of Patent: *Jul. 1, 2003

(54) POLYCRYSTALLINE DIAMOND PARTIALLY DEPLETED OF CATALYZING MATERIAL

(76) Inventors: Nigel Dennis Griffin, Haverhill, Church Street, Nympsfield Gloucestershire, GL10 3UB (GB); Peter Raymond Hughes, 18 The Stirrup, Cashes Green, Stroud Gloucestershire, GL5 4SG (GB)

(*) Notice: Subject to any disclaimer, the term of this patent is extended or adjusted under 35 U.S.C. 154(b) by 0 days.

This patent is subject to a terminal disclaimer.

(21) Appl. No.: 10/065,615

(22) Filed: Nov. 4, 2002

(65) Prior Publication Data

US 2003/0035958 A1 Feb. 20, 2003

Related U.S. Application Data

(63) Continuation of application No. 09/682,042, filed on Jul. 13, 2001.
(60) Provisional application No. 60/234,075, filed on Sep. 20, 2000, and provisional application No. 60/281,054, filed on Apr. 2, 2001.

(51) Int. Cl.$^7$ ............................................... E21B 10/36
(52) U.S. Cl. ..................... 175/434; 175/327; 175/425; 175/426; 175/428
(58) Field of Search ........................ 428/408; 175/327, 175/425, 426, 428, 434

(56) References Cited

U.S. PATENT DOCUMENTS

| | | | |
|---|---|---|---|
| 3,138,615 A | 6/1964 | Bovenkerk | |
| 3,141,746 A | 7/1964 | DeLal | |
| 3,233,988 A | 2/1966 | Wentorf, Jr. | |

(List continued on next page.)

FOREIGN PATENT DOCUMENTS

| | | |
|---|---|---|
| EP | 0300699 A2 | 1/1989 |
| EP | 0329954 B1 | 8/1993 |
| EP | 0617207 A3 | 9/1994 |
| EP | 0595631 B1 | 4/1997 |
| EP | 0787820 A2 | 8/1997 |
| EP | 0500253 B1 | 11/1997 |
| EP | 0595630 B1 | 1/1998 |
| EP | 0612868 B1 | 7/1998 |
| EP | 0860515 A1 | 8/1998 |
| GB | 1349385 | 4/1974 |
| GB | 2048927 A | 12/1980 |
| GB | 2268768 A | 1/1994 |
| GB | 2323398 A | 9/1998 |
| WO | WO96/34131 A1 | 10/1996 |

OTHER PUBLICATIONS

Translation of Japanese Unexamined Patent Application No. S59–219500, "Diamond Sintering and Processing Method," Shuji Yatsu and Tetsuo Nakai, inventors; Application published Dec. 10, 1984; Applicant: Sumitomo Electric Industries Co. Ltd.

Primary Examiner—Archene Turner
(74) Attorney, Agent, or Firm—Jeffrey E. Daly

(57) ABSTRACT

The present invention provides an earth boring drill bit with a superhard polycrystalline diamond or diamond-like element with greatly improved resistance to thermal degradation without loss of impact strength. Collectively called PCD elements, these elements are formed with a binder-catalyzing material in a high-temperature, high-pressure process. The PCD element has a plurality of partially bonded diamond or diamond-like crystals forming at least one continuous diamond matrix, and the interstices among the diamond crystals forming at least one continuous interstitial matrix containing a catalyzing material. The element has a working surface and a body, where a portion of the interstitial matrix in the body adjacent to the working surface is substantially free of the catalyzing material, and the remaining interstitial matrix contains the catalyzing material. This translates to higher wear resistance in cutting applications and has advantages in numerous other applications.

40 Claims, 7 Drawing Sheets

U.S. PATENT DOCUMENTS

| | | |
|---|---|---|
| 4,108,614 A | 8/1978 | Mitchell |
| 4,151,686 A | 5/1979 | Lee et al. |
| 4,224,380 A | 9/1980 | Bovenkerk et al. |
| 4,255,165 A | 3/1981 | Dennis et al. |
| 4,268,276 A | 5/1981 | Bovenkerk |
| 4,303,442 A | 12/1981 | Hara et al. |
| 4,311,490 A | 1/1982 | Bovenkerk et al. |
| 4,373,593 A | 2/1983 | Phaal et al. |
| 4,387,287 A | 6/1983 | Marazzi |
| 4,412,980 A | 11/1983 | Tsuji et al. |
| 4,481,016 A | 11/1984 | Campbell et al. |
| 4,486,286 A | 12/1984 | Lewin et al. |
| 4,504,519 A | 3/1985 | Zelez |
| 4,522,633 A | 6/1985 | Dyer |
| 4,525,179 A | 6/1985 | Gigl |
| 4,534,773 A | 8/1985 | Phaal et al. |
| 4,556,403 A | 12/1985 | Almond et al. |
| 4,560,014 A | 12/1985 | Geczy |
| 4,570,726 A | 2/1986 | Hall |
| 4,572,722 A | 2/1986 | Dyer |
| 4,604,106 A | 8/1986 | Hall et al. |
| 4,605,343 A | 8/1986 | Hibbs, Jr. et al. |
| 4,606,738 A | 8/1986 | Hayden |
| 4,621,031 A | 11/1986 | Scruggs |
| 4,636,253 A | 1/1987 | Nakai et al. |
| 4,645,977 A | 2/1987 | Kurokawa et al. |
| 4,662,348 A | 5/1987 | Hall et al. |
| 4,664,705 A | 5/1987 | Horton et al. |
| 4,670,025 A | 6/1987 | Pipkin |
| 4,707,384 A | 11/1987 | Schachner et al. |
| 4,726,718 A | 2/1988 | Meskin et al. |
| 4,766,040 A | 8/1988 | Hillert et al. |
| 4,776,861 A | 10/1988 | Frushour |
| 4,792,001 A | 12/1988 | Zijsling |
| 4,793,828 A | 12/1988 | Burnand |
| 4,797,241 A | 1/1989 | Peterson et al. |
| 4,802,539 A | 2/1989 | Hall et al. |
| 4,807,402 A | 2/1989 | Rai |
| 4,828,582 A | 5/1989 | Frushour |
| 4,861,350 A | 8/1989 | Phaal et al. |
| 4,871,377 A | 10/1989 | Frushour |
| 4,899,922 A | 2/1990 | Slutz et al. |
| 4,919,220 A | 4/1990 | Fuller et al. |
| 4,940,180 A | 7/1990 | Martell |
| 4,943,488 A | 7/1990 | Sung et al. |
| 4,944,772 A | 7/1990 | Cho |
| 4,976,324 A | 12/1990 | Tibbitts |
| 5,011,514 A | 4/1991 | Cho et al. |
| 5,027,912 A | 7/1991 | Juergens |
| 5,030,276 A | 7/1991 | Sung et al. |
| 5,092,687 A | 3/1992 | Hall |
| 5,116,568 A | 5/1992 | Sung et al. |
| 5,127,923 A | 7/1992 | Bunting et al. |
| 5,135,061 A | 8/1992 | Newton, Jr. |
| 5,176,720 A | 1/1993 | Martell et al. |
| 5,186,725 A | 2/1993 | Martell et al. |
| 5,199,832 A | 4/1993 | Meskin et al. |
| 5,205,684 A | 4/1993 | Meskin et al. |
| 5,213,248 A | 5/1993 | Horton et al. |
| 5,238,074 A | 8/1993 | Tibbitts |
| 5,264,283 A | 11/1993 | Waldenstrom |
| 5,337,844 A | 8/1994 | Tibbitts |
| 5,370,195 A | 12/1994 | Keshavan et al. |
| 5,379,853 A | 1/1995 | Lockwood |
| 5,439,492 A | 8/1995 | Anthony et al. |
| 5,464,068 A | 11/1995 | Najafi-Sani |
| 5,468,268 A | 11/1995 | Tank et al. |
| 5,496,638 A | 3/1996 | Waldenstrom |
| 5,505,748 A | 4/1996 | Tank et al. |
| 5,510,193 A | 4/1996 | Cerutti et al. |
| 5,523,121 A | 6/1996 | Anthony et al. |
| 5,524,719 A | 6/1996 | Dennis |
| 5,560,716 A | 10/1996 | Tank et al. |
| 5,607,024 A | 3/1997 | Keith et al. |
| 5,620,382 A | 4/1997 | Cho et al. |
| 5,624,068 A | 4/1997 | Waldenstrom et al. |
| 5,667,028 A | 9/1997 | Truax et al. |
| 5,718,948 A | 2/1998 | Edervd et al. |
| 5,722,499 A | 3/1998 | Nguyen et al. |
| 5,776,615 A | 7/1998 | Wong et al. |
| 5,833,021 A | 11/1998 | Mensa-Wilmot et al. |
| 5,897,942 A | 4/1999 | Karner et al. |
| 5,954,147 A | 9/1999 | Overstreet |
| 5,979,578 A | 11/1999 | Packer |
| 6,009,963 A | 1/2000 | Chaves et al. |
| 6,063,333 A | 5/2000 | Dennis |
| 6,123,612 A | 9/2000 | Goers |
| 6,126,741 A | 10/2000 | Jones et al. |
| 6,248,447 B1 | 6/2001 | Griffin et al. |
| 6,269,894 B1 | 8/2001 | Griffin et al. |
| 6,344,149 B1 | 2/2002 | Oles |

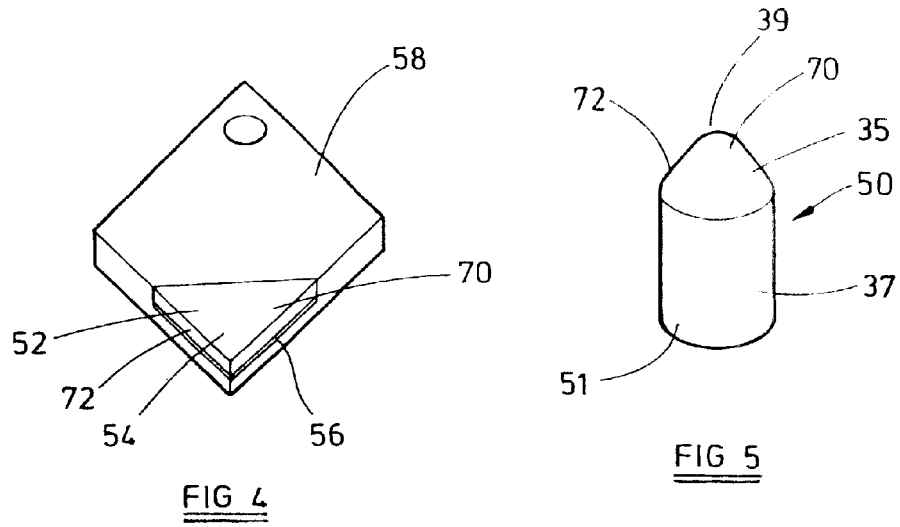
FIG 4
FIG 5
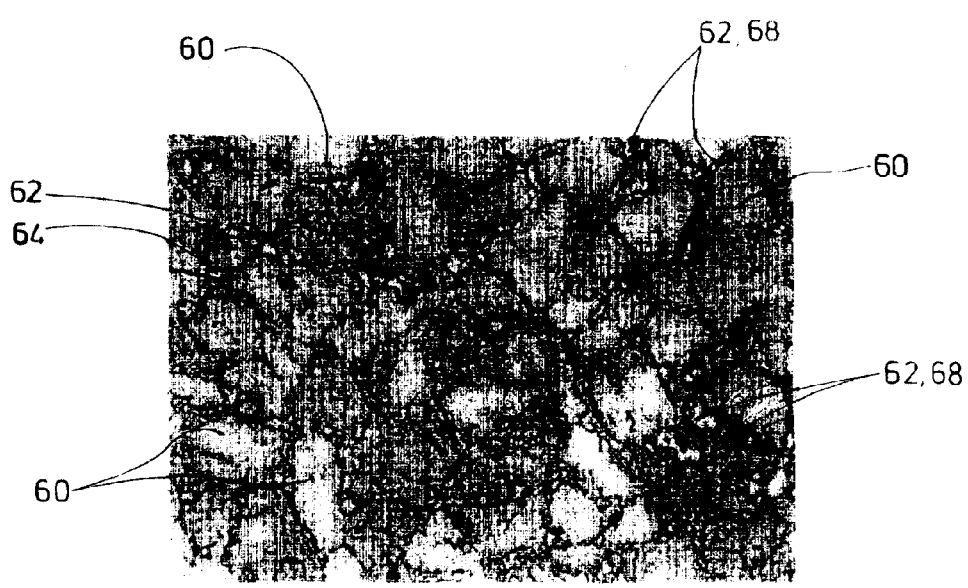
FIG 6
(Prior Art)

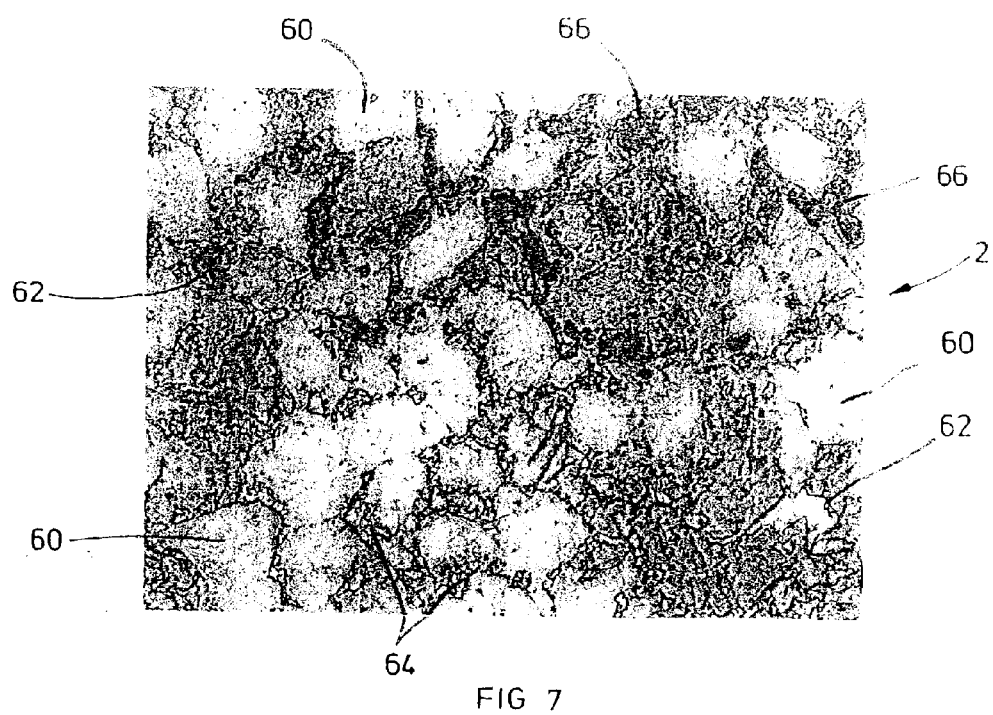
FIG 7
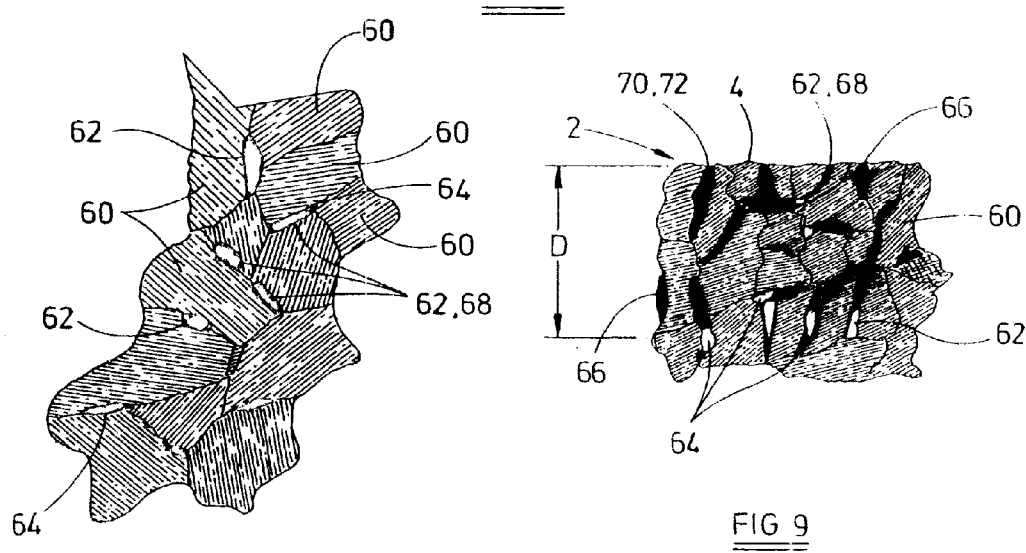
FIG 8
(Prior Art)
FIG 9

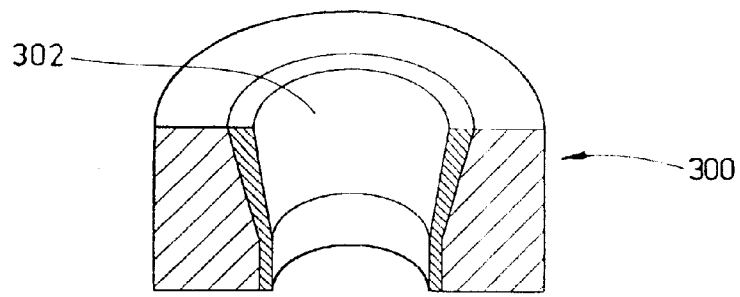
FIG 13
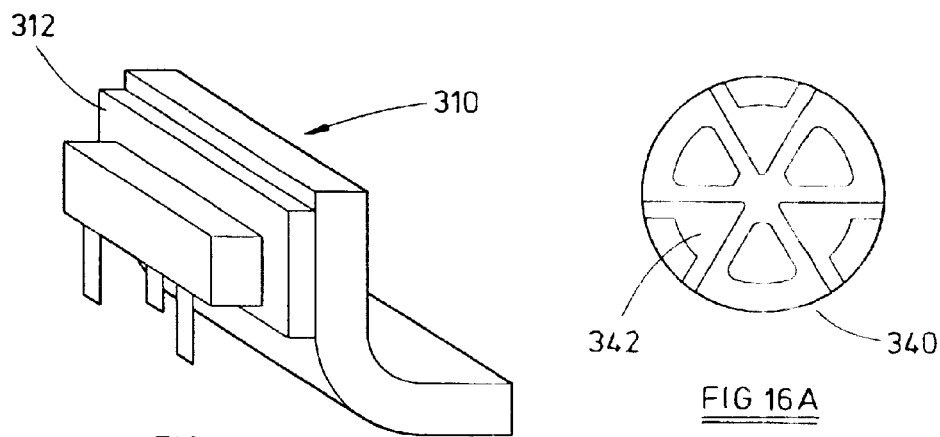
FIG 14
FIG 16A
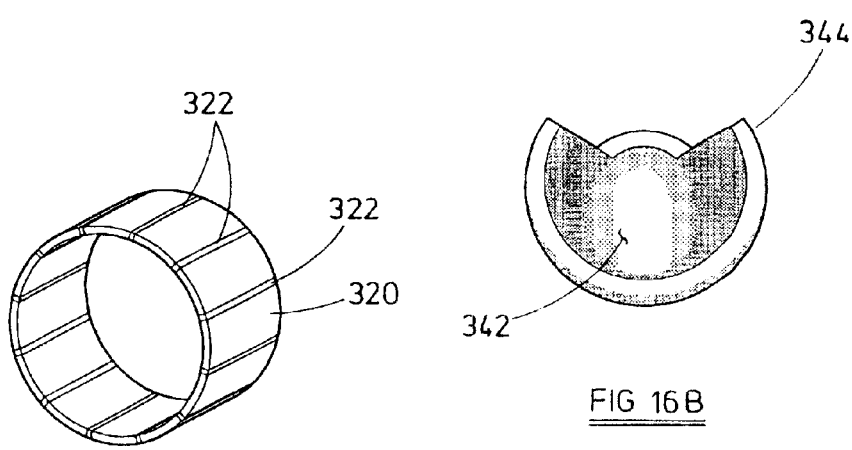
FIG 15
FIG 16B

POLYCRYSTALLINE DIAMOND PARTIALLY DEPLETED OF CATALYZING MATERIAL

CROSS REFERENCE TO RELATED APPLICATIONS

This application is a continuation of pending U.S. patent application Ser. No. 09/682,042 filed on Jul. 13, 2001, by Nigel D. Griffin and Peter R. Hughes, hereby incorporated herein by reference, which claims priority from U.S. Provisional Patent Application No. 60/234,075 filed Sep. 20, 2000, and from U.S. Provisional Patent Application No. 60/281,054 filed Apr. 2, 2001.

BACKGROUND OF INVENTION

1. Field of the Invention

The invention relates to superhard polycrystalline material elements for wear, cutting, drawing, and other applications where engineered superhard surfaces are needed. The invention particularly relates to polycrystalline diamond and polycrystalline diamond-like (collectively called PCD) elements with greatly improved wear resistance and methods of manufacturing them.

2. Description of Related Art

Polycrystalline diamond and polycrystalline diamond-like elements are known, for the purposes of this specification, as PCD elements. PCD elements are formed from carbon based materials with exceptionally short interatomic distances between neighboring atoms. One type of polycrystalline diamond-like material is known as carbonitride (CN) described in U.S. Pat. No. 5,776,615. Another, more commonly used form of PCD is described in more detail below. In general, PCD elements are formed from a mix of materials processed under high-temperature and high-pressure into a polycrystalline matrix of inter-bonded superhard carbon based crystals. A common trait of PCD elements is the use of catalyzing materials during their formation, the residue from which, often imposes a limit upon the maximum useful operating temperature of the element while in service.

A well known, manufactured form of PCD element is a two-layer or multi-layer PCD element where a facing table of polycrystalline diamond is integrally bonded to a substrate of less hard material, such as tungsten carbide. The PCD element may be in the form of a circular or part-circular tablet, or may be formed into other shapes, suitable for applications such as hollow dies, heat sinks, friction bearings, valve surfaces, indentors, tool mandrels, etc. PCD elements of this type may be used in almost any application where a hard wear and erosion resistant material is required. The substrate of the PCD element may be brazed to a carrier, often also of cemented tungsten carbide. This is a common configuration for PCD"s used as cutting elements, for example in fixed cutter or rolling cutter earth boring bits when received in a socket of the drill bit, or when fixed to a post in a machine tool for machining. These PCD elements are typically called PDC"s.

Another form of PCD element is a unitary PCD element without an integral substrate where a table of polycrystalline diamond is fixed to a tool or wear surface by mechanical means or a bonding process. These PCD elements differ from those above in that diamond particles are present throughout the element. These PCD elements may be held in place mechanically, they may be embedded within a larger PCD element that has a substrate, or, alternately, they may be fabricated with a metallic layer which may be bonded with a brazing or welding process. A plurality of these PCD elements may be made from a single PCD, as shown, for example, in U.S. Pat. Nos. 4,481,016 and 4,525,179 herein incorporated by reference for all they disclose.

PCD elements are most often formed by sintering diamond powder with a suitable binder-catalyzing material in a high-pressure, high-temperature press. One particular method of forming this polycrystalline diamond is disclosed in U.S. Pat. No. 3,141,746 herein incorporated by reference for all it discloses. In one common process for manufacturing PCD elements, diamond powder is applied to the surface of a preformed tungsten carbide substrate incorporating cobalt. The assembly is then subjected to very high temperature and pressure in a press. During this process, cobalt migrates from the substrate into the diamond layer and acts as a binder-catalyzing material, causing the diamond particles to bond to one another with diamond-to-diamond bonding, and also causing the diamond layer to bond to the substrate.

The completed PCD element has at least one matrix of diamond crystals bonded to each other with many interstices containing a binder-catalyzing material metal as described above. The diamond crystals comprise a first continuous matrix of diamond, and the interstices form a second continuous matrix of interstices containing the binder-catalyzing material. In addition, there are necessarily a relatively few areas where the diamond to diamond growth has encapsulated some of the binder-catalyzing material. These "islands" are not part of the continuous interstitial matrix of binder-catalyzing material.

In one common form, the diamond element constitutes 85% to 95% by volume and the binder-catalyzing material the other 5% to 15%. Such an element may be subject to thermal degradation due to differential thermal expansion between the interstitial cobalt binder-catalyzing material and diamond matrix beginning at temperatures of about 400 degrees C. Upon sufficient expansion the diamond-to-diamond bonding may be ruptured and cracks and chips may occur.

Also in polycrystalline diamond, the presence of the binder-catalyzing material in the interstitial regions adhering to the diamond crystals of the diamond matrix leads to another form of thermal degradation. Due to the presence of the binder-catalyzing material, the diamond is caused to graphitize as temperature increases, typically limiting the operation temperature to about 750 degrees C.

Although cobalt is most commonly used as the binder-catalyzing material, any group VIII element, including cobalt, nickel, iron, and alloys thereof, may be employed.

To reduce thermal degradation, so-called "thermally stable" polycrystalline diamond components have been produced as preform PCD elements for cutting and/or wear resistant elements, as disclosed in U.S. Pat. No. 4,224,380 herein incorporated by reference for all it discloses. In one type of thermally stable PCD element the cobalt or other binder-catalyzing material in conventional polycrystalline diamond is leached out from the continuous interstitial matrix after formation. While this may increase the temperature resistance of the diamond to about 1200 degrees C., the leaching process also removes the cemented carbide substrate. In addition, because there is no integral substrate or other bondable surface, there are severe difficulties in mounting such material for use in operation.

The fabrication methods for this "thermally stable" PCD element typically produce relatively low diamond densities, of the order of 80% or less. This low diamond density enables a thorough leaching process, but the resulting finished part is typically relatively weak in impact strength.

In an alternative form of thermally stable polycrystalline diamond, silicon is used as the catalyzing material. The process for making polycrystalline diamond with a silicon catalyzing material is quite similar to that described above, except that at synthesis temperatures and pressures, most of the silicon is reacted to form silicon carbide, which is not an effective catalyzing material. The thermal resistance is somewhat improved, but thermal degradation still occurs due to some residual silicon remaining, generally uniformly distributed in the interstices of the interstitial matrix. Again, there are mounting problems with this type of PCD element because there is no bondable surface.

More recently, a further type of PCD has become available in which carbonates, such as powdery carbonates of Mg, Ca, Sr, and Ba are used as the binder-catalyzing material when sintering the diamond powder. PCD of this type typically has greater wear-resistance and hardness than the previous types of PCD elements. However, the material is difficult to produce on a commercial scale since much higher pressures are required for sintering than is the case with conventional and thermally stable polycrystalline diamond. One result of this is that the bodies of polycrystalline diamond produced by this method are smaller than conventional polycrystalline diamond elements. Again, thermal degradation may still occur due to the residual binder-catalyzing material remaining in the interstices. Again, because there is no integral substrate or other bondable surface, there are difficulties in mounting this material to a working surface.

Efforts to combine thermally stable PCD"s with mounting systems to put their improved temperature stability to use have not been as successful as hoped due to their low impact strength. For example, various ways of mounting multiple PCD elements are shown in U.S. Pat. Nos. 4,726,718; 5,199,832; 5,025,684; 5,238,074; 6,009,963 herein incorporated by reference for all they disclose. Although many of these designs have had commercial success, the designs have not been particularly successful in combining high wear and/or abrasion resistance while maintaining the level of toughness attainable in non-thermally stable PCD.

Other types of diamond or diamond like coatings for surfaces are disclosed in U.S. Pat. Nos. 4,976,324; 5,213,248; 5,337,844; 5,379,853; 5,496,638; 5,523,121; 5,624,068 all herein incorporated by reference for all they disclose. Similar coatings are also disclosed in GB Patent Publication No. 2,268,768, PCT Publication No. 96/34,131, and EPC Publications 500,253; 787,820; 860,515 for highly loaded tool surfaces. In these publications, diamond and/or diamond like coatings are shown applied on surfaces for wear and/or erosion resistance.

In many of the above applications physical vapor deposition (PVD) and/or chemical vapor deposition (CVD) processes are used to apply the diamond or diamond like coating. PVD and CVD diamond coating processes are well known and are described for example in U.S. Pat. Nos. 5,439,492; 4,707,384; 4,645,977; 4,504,519; 4,486,286 all herein incorporated by reference.

PVD and/or CVD processes to coat surfaces with diamond or diamond like coatings may be used, for example, to provide a closely packed set of epitaxially oriented crystals of diamond or other superhard crystals on a surface. Although these materials have very high diamond densities because they are so closely packed, there is no significant amount of diamond to diamond bonding between adjacent crystals, making them quite weak overall, and subject to fracture when high shear loads are applied. The result is that although these coatings have very high diamond densities, they tend to be mechanically weak, causing very poor impact toughness and abrasion resistance when used in highly loaded applications such as with cutting elements, bearing devices, wear elements, and dies.

Some attempts have been made to improve the toughness and wear resistance of these diamond or diamond like coatings by application to a tungsten carbide substrate and subsequently processing in a high-pressure, high-temperature environment as described in U.S. Pat. Nos. 5,264,283; 5,496,638; 5,624,068 herein incorporated by reference for all they contain. Although this type of processing may improve the wear resistance of the diamond layer, the abrupt transition between the high-density diamond layer and the substrate make the diamond layer susceptible to wholesale fracture at the interface at very low strains. This translates to very poor toughness and impact resistance in service.

When PCD elements made with a cobalt or other group VIII metal binder-catalyzing material were used against each other as bearing materials, it was found that the coefficient of friction tended to increase with use. As described in European Patent specification number 617,207, it was found that removal (by use of a hydrochloric acid wipe) of the cobalt-rich tribofilm which tended to build up in service from the surface of the PCD bearing element, tended to mitigate this problem. Apparently, during operation, some of the cobalt from the PCD at the surface migrates to the load area of the bearing, causing increased friction when two PCD elements act against each other as bearings. It is now believed that the source of this cobalt may be a residual by-product of the finishing process of the bearing elements, as the acid wipe remedy cannot effectively remove the cobalt to any significant depth below the surface.

Because the cobalt is removed only from the surface of the PCD, there is no effective change in the temperatures at which thermal degradation occurs in these bearing elements. Therefore the deleterious effects of the binder-catalyzing material remain, and thermal degradation of the diamond layer due to the presence of the catalyzing material still occurs.

SUMMARY OF THE INVENTION

The present invention provides a superhard polycrystalline diamond or diamond-like element with greatly improved resistance to thermal degradation without loss of impact strength. Collectively called PCD elements for the purposes of this specification, these elements are formed with a binder-catalyzing material in a high-temperature, high-pressure process. The PCD element has a plurality of partially bonded diamond or diamond-like crystals forming at least one continuous diamond matrix, and the interstices among the diamond crystals forming at least one continuous interstitial matrix containing a catalyzing material. The element has a working surface and a body, where a portion of the interstitial matrix in the body adjacent to the working surface is substantially free of the catalyzing material, and the remaining interstitial matrix contains the catalyzing material.

A portion of the working surface on the body of the PCD element may be post-processed so that the interstices among the superhard crystals are substantially free of the catalyzing material. The working surface that is substantially free of the catalyzing material is not subject to the thermal degradation encountered in the other areas of the working surface, resulting in improved resistance to thermal degradation. In cutting elements, the processed working surface may be a portion of the facing table of the body, a portion of the peripheral surface of the body, or portions of all these surfaces.

In another embodiment, the catalyzing material is cobalt or other iron group metal, and the method of depleting the catalyzing material is to leach it from the interstices near the surface of a PCD element in an acid etching process. It is anticipated that the method of removing the catalyzing material from the surface may also be by electrical discharge, or other electrical or galvanic process, or by evaporation.

In another embodiment, the catalyzing material is subsequently removed from the working surface of a PCD element by combining it chemically with another material such that it no longer acts as a catalyzing material. In this method, a material may remain in the interstices among the diamond crystals, but that material no longer acts as a catalyzing material effectively removing or depleting the catalyzing material.

In still another embodiment, the catalyzing material is removed by causing it to transform into a material that no longer acts as a catalyzing material. This may be accomplished by a crystal structure change, mechanical "working", thermal treatment or other treatment methods. This method may apply to non-metallic or non-reactive catalyzing material. Again, a material may remain in the interstices among the superhard material crystals, but that material no longer acts as a catalyzing material effectively removing or depleting the catalyzing material.

Disclosed is an element comprising a plurality of partially bonded diamond crystals, a catalyzing material, an interstitial matrix, and a body with a working surface. The interstitial matrix in the body adjacent to the working surface is substantially free of the catalyzing material, and the remaining interstitial matrix contains the catalyzing material.

Similarly, a PCD element is disclosed having a catalyzing material, an interstitial matrix, and a body with a working surface. The interstitial matrix in the body adjacent to the working surface is substantially free of the catalyzing material, and the remaining interstitial matrix contains the catalyzing material.

Also, a PCD element is disclosed having a plurality of superhard crystals, a catalyzing material and a body with a working surface. In this element, a majority of the crystals in the body within at least a 0.1 mm depth from the working surface have a surface which is substantially free of the catalyzing material and the remaining crystals are contacting the catalyzing material.

Furthermore, a PCD element is disclosed having a body with a working surface. A first volume of the body remote from the working surface contains a catalyzing material, and a second volume of the body adjacent to the working surface is substantially free of the catalyzing material.

Also, an element is disclosed having a plurality of partially bonded diamond crystals, a catalyzing material, and a body with a working surface. The volume of the body adjacent the working surface has a substantially higher diamond density than elsewhere in the body, and the volume is substantially free of the catalyzing material.

Also, a PCD element is disclosed having a body with a working surface. The volume of the body adjacent to the working surface has a diamond density substantially higher than elsewhere in the body, and the volume is substantially free of a catalyzing material.

In addition, a preform cutting element is disclosed. The element has a facing table of a superhard polycrystalline material having a plurality of partially bonded superhard crystals, a plurality of interstitial regions among the superhard crystals and a catalyzing material. The facing table has a cutting surface and a body. The interstitial regions in at least a portion of the cutting surface are substantially free of the catalyzing material and the remainder of the interstitial regions contain the catalyzing material.

The PCD elements of the present invention may be used for wear, cutting, drawing, and other applications where engineered diamond surfaces are needed. Specific applications are as cutting elements in rotary drill bits of both the fixed cutter type and the rolling cutter type, as hollow dies, heat sinks, friction bearings, valve surfaces, indentors, tool mandrels, etc. The PCD element of the present invention may be used to machine abrasive wood products, ferrous and nonferrous materials and also very hard or abrasive engineering materials such as stone and asphalt and the like.

BRIEF DESCRIPTION OF DRAWINGS

FIG. 4 is a perspective view of an insert used in machine tools utilizing the PCD element of the present invention.

FIG. 5 is a perspective view of a dome shaped PCD element suitable for use in both rolling cutter drill bits and in fixed cutter drill bits.

FIG. 6 is a photo-micrograph of the surface of a PCD element of the prior art showing the binder-catalyzing material in the interstitial regions.

FIG. 7 is a photo-micrograph of the PCD element of the present invention showing a first portion with a catalyzing material in the interstitial regions and a second portion without the catalyzing material in the interstitial regions.

FIG. 8 is a micro-structural representation of a PCD element of the prior art, showing the bonded diamond crystals, with the interstitial regions and the crystallographic orientation of the individual crystals.

FIG. 9 is a micro-structural representation of the PCD element of the present invention as shown in FIG. 7, indicating the depth of the catalyzing material free region relative to the surface of the PCD element.

FIG. 13 is a section view of a wire drawing die having a PCD element of the present invention.

FIG. 14 is perspective view of a heat sink having a PCD element of the present invention.

FIG. 15 is perspective view of a bearing having a PCD element of the present invention.

FIGS. 16A and 16B are front views of the mating parts of a valve having a PCD element of the present invention.

DETAILED DESCRIPTION

Figure 1A:
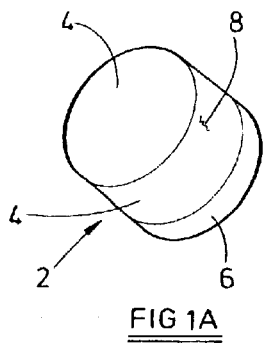
FIG. 1A is a typical PCD element of the present invention.

The polycrystalline diamond or diamond-like material (PCD) element 2 of the present invention is shown in FIG. 1A. The PCD element 2 has a plurality of partially bonded superhard, diamond or diamond-like, crystals 60, (shown in FIGS. 7 and 9) a catalyzing material 64, and an interstitial matrix 68 formed by the interstices 62 among the crystals 60. The element 2 also has one or more working surfaces 4 and the diamond crystals 60 and the interstices 62 form the volume of the body 8 of the PCD element 2.

The working surface 4 is any portion of the PCD body 8 which, in operation, may contact the object to be worked. In this specification, when the working surface 4 is discussed, it is understood that it applies to any portion of the body 8 which may be exposed and/or used as a working surface. Furthermore, any portion of any of the working surface 4 is, in and of itself, a working surface.

During manufacture, under conditions of high-temperature and high-pressure, the interstices 62 among the crystals 60 fill with the catalyzing material 64 just as the bonds among the crystals 60 are being formed. In a further step of the manufacture, some of the catalyzing material 64 is selectively depleted from some of the interstices 62. The result is that a first volume of the body 8 of the PCD element 2 remote from the working surface 4 contains the catalyzing material 64, and a second volume of the body 8 adjacent to the working surface 4 is substantially free of the catalyzing material 64. The interstices 62 which are substantially free of the catalyzing material 64 are indicated by numeral 66.

Therefore, the interstitial matrix 68 of the body 8 adjacent to at least a portion of the working surface 4 is substantially free of the catalyzing material 64, and the remaining interstitial matrix 68 contains the catalyzing material 64. The PCD element 2 may be bonded to a substrate 6 of less hard material, usually cemented tungsten carbide, but use of a substrate 6 is not required.

Because the body adjacent to the working surface 4 is substantially free of the catalyzing material 64, the deleterious effects of the binder-catalyzing material 64 are substantially decreased, and thermal degradation of the working surface 4 due to the presence of the catalyzing material 64 is effectively eliminated. The result is a new PCD element 2 that has the enhanced thermal properties approximating that of the so called thermally stable PCD elements, while maintaining the toughness, convenience of manufacture, and bonding ability of the traditional PDC elements. This translates to higher wear resistance in cutting applications, higher heat transfer capacity in heat sink applications, higher load capacity in bearing applications, less surface distortion in valve applications, and has advantages in numerous other applications including hollow dies, indentors, tool mandrels, and wear elements. Details of specific applications of the new PCD element 2 will be discussed in more detail later in the specification.

Referring now to the photo-micrograph of a prior art PCD element in FIG. 6, and also the microstructural representation of a PCD element of the prior art in FIG. 8, it is well known that there is a random crystallographic orientation of the diamond or diamond-like crystals 60 as shown by the parallel lines representing the cleavage planes of each crystal 60. As can be seen, adjacent crystals 60 have bonded together with interstitial spaces 62 among them. Because the cleavage planes are oriented in different directions on adjacent crystals 60 there is generally no straight path available for diamond fracture. This structure allows PCD materials to perform well in extreme loading environments where high impact loads are common.

In the process of bonding the crystals 60 in a high-temperature, high-pressure press, the interstitial spaces 62 among the crystals 60 become filled with a binder-catalyzing material 64. It is this catalyzing material 64 that allows the bonds to be formed between adjacent diamond crystals 60 at the relatively low pressures and temperatures present in the press.

The prior art PCD element has at least one continuous matrix of crystals 60 bonded to each other with the many interstices 62 containing a binder-catalyzing material 64, typically cobalt or other group VIII element. The crystals 60 comprise a first continuous matrix of diamond, and the interstices 62 form a second continuous matrix of interstices 62 known as the interstitial matrix 68, containing the binder-catalyzing material. In addition, there are necessarily a relatively few areas where the diamond to diamond growth has encapsulated some of the binder-catalyzing material. These "islands" are not part of the continuous interstitial matrix 68 of binder-catalyzing material 64.

Referring now to FIGS. 7 and 9, shown is a cross section of the PCD element 2 of the present invention. The PCD element 2 may be formed in the same manner as the prior art PCD elements described above. In a preferred embodiment, after a preliminary cleanup operation or at any time thereafter in the process of manufacturing, the working surface 4, 70, 72 of the PCD element 2 is processed in a manner which removes a portion of the binder-catalyzing material from the adjacent body. The result is that the interstices 62 among the diamond crystals 60 adjacent to the working surface are substantially free of the catalyzing material 64 indicated by numeral 66. The portion of the working surface 4, 70, 72 that is free of the catalyzing material 64 is not subject to the thermal degradation encountered in the other areas of the PCD, resulting in improved thermal characteristics.

There are many methods for removing or depleting the catalyzing material 64 from the interstices 62. In one method, the catalyzing material 64 is cobalt or other iron group material, and the method of removing the catalyzing material 64 is to leach it from the interstices 62 near the working surface 4, 70, 72 of a PCD element 2 in an acid etching process to a depth of greater than about 0.2 mm. It is also possible that the method of removing the catalyzing material 64 from near the surface may be by electrical discharge, or other electrical or galvanic process or by evaporation.

In another method for depleting the catalyzing material 64 from the interstices 62, the catalyzing material 64 is depleted by combining it chemically, such as alloying, with another material such that it no longer acts as a catalyzing material. In this method, a material may remain in the interstices among the diamond crystals 60 but that material no longer acts as a catalyzing material 64 effectively removing it.

In still another method for depleting the catalyzing material 64 from the interstices 62, the catalyzing material 64 is removed by causing it to transform into a material that no longer acts as a catalyzing material. This may be accomplished by a crystal structure change, phase change, mechanical "working", thermal treatment or other treatment methods. This method may apply to non-metallic or non-reactive catalyzing materials. Again, a material may remain in the interstices 62 among the diamond crystals, but that material no longer acts as a catalyzing material 64 effectively removing the catalyzing material.

Once the catalyzing material 64 adjacent to the working surface 4, 70, 72 has been rendered ineffective, the PCD element 2 of the present invention is no longer susceptible to the type of thermal degradation known to occur in the prior art PCD elements. As previously described, there are two modes of thermal degradation known to be caused by the catalyzing material 64. The first mode of thermal degradation begins at temperatures as low as about 400 degrees C. and is due to differential thermal expansion between the catalyzing material 64 in the interstices 62 and the crystals 60. Upon sufficient expansion the diamond-to-diamond bonding may be ruptured and cracks and chips may occur.

The second mode of thermal degradation begins at temperatures of about 750 degrees C. This mode is caused by the catalyzing ability of the binder-catalyzing material 64 contacting the crystals 60, and causing the crystals 60 to graphitize as the temperature nears 750 degrees C. As the crystals 60 graphitize, they undergo a huge volume increase resulting in cracking and dis-bond from the body 4. Even a thickness of a few microns of the catalyzing material 64 on the surfaces of the diamond crystals 60 can enable this mode of thermal degradation.

It would therefore be appreciated by those skilled in the art that for maximum benefit, the catalyzing material 64 must be removed both from the interstices 62 among the diamond crystals 60 and from the surfaces of the diamond crystals 60 as well. If the catalyzing material 64 is removed from both the surfaces of the diamond crystals 60 and from the interstices 62 the onset of thermal degradation for the diamond crystals 60 in that region would approach 1200 C.

This dual degradation mode, however, provides some unexpected benefits. For example, in many applications it is desirable to engineer the wear rate of the working surface. In the present invention, this may be accomplished by changing the treatment process such that in areas requiring maximum wear resistance, the catalyzing material is depleted from both the interstices 62 and the surfaces of the diamond crystals 60. In areas where less wear resistance is desired, for example in a self sharpening tool, those areas would be treated so as to deplete the catalyzing material 64 primarily from the interstices 62, but allowing some, if not all, of the diamond crystals 60 to remain in contact with the catalyzing material.

It should also be apparent, that it is more difficult to remove the catalyzing material 64 from the surfaces of the diamond crystals 60 than from the interstices 62. For this reason, depending upon the manner in which the catalyzing material is depleted, to be effective in reducing thermal degradation, the depth of depletion of the catalyzing material 64 from the working surface 4 may vary depending upon the method used for depleting the catalyzing material 64.

In some applications, improvement of the thermal threshold to above 400 C. but less than 750 C. is adequate, and therefore a less intense catalyzing material 64 depletion process is permissible. As a consequence, it would be appreciated that there are numerous combinations of catalyzing material 64 depletion methods which could be applied to achieve the level of catalyzing material 64 depletion required for a specific application.

In this specification, when the term "substantially free" is used referring to catalyzing material 64 in the interstices 62, the interstitial matrix 68, or in a volume of the body 8, it should be understood that many, if not all, the surfaces of the adjacent diamond crystals 60 may still have a coating of the catalyzing material 64. Likewise, when the term "substantially free" is used referring to catalyzing material 64 on the surfaces of the diamond crystals 60, there may still be catalyzing material 64 present in the adjacent interstices 62.

With the catalyzing material 64 removed or depleted, two major mechanisms for thermal degradation are no longer present. However, it has been found that the catalyzing material 64 has to be removed at a depth sufficient to all the bonded crystals 60 to conduct away the heat generated by a thermal event to below the degradation temperature of the crystals 60 where the catalyzing material 64 is present.

In one set of laboratory tests, heat was input into a PCD element 2 configured as a cutting element 10. Since this test was designed as a standard wear test for these cutting elements, it provided a reasonable comparison of cutting elements 10 with various depths of the catalyzing material 64 removal. In these tests, care was taken to assure the depletion process removed the catalyzing material 64 from both the interstices 62 and from the surfaces of the diamond crystals 60. The test was designed such that a repeatable input of heat was applied to the cutting edge of the PCD cutting element 10 for a known period of time.

Once the test was complete, a wear index was calculated. The higher the wear index, the better the wear resistance. Due to the nature of the test, it is assumed that an increased-wear index number indicates increased resistance to thermal degradation of the working surface 70, 72 of the cutting element 10.

Figure 10:
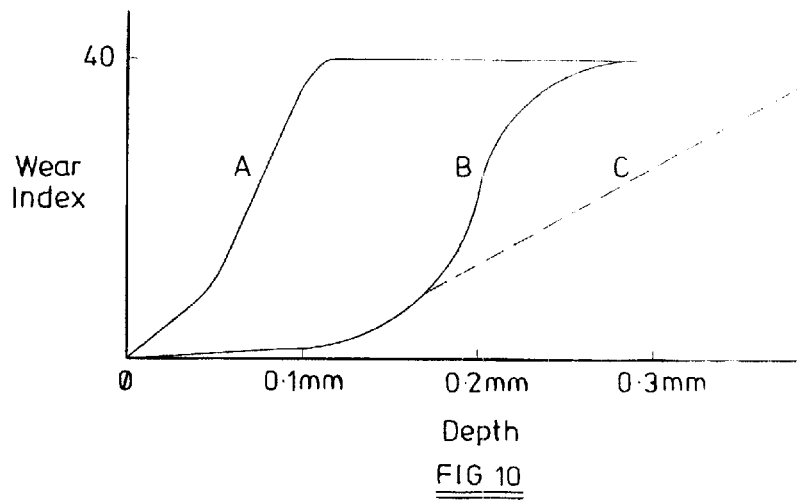
FIG. 10 is a graph of the relative wear indices of several embodiments of the PCD element of the present invention.

As can be seen in curve A in the graph of FIG. 10 there is a dramatic increase in the wear index result for cutting elements 10 when the catalyzing material 64 depletion depth approaches 0.1 mm. Therefore, for the types of heat input common in cutting elements 10, a 0.1 mm depth is the critical depletion depth from the working surface 4, 70, 72 when the catalyzing material 64 is removed from both interstices 62 and from the surfaces of the diamond crystals 60.

In other tests, on cutting elements 10 made with a more economical process for removing the catalyzing material 64, the wear versus depth of depletion is believed to approximate that shown in curve "B" of FIG. 10. The catalyzing material 64 depletion process used in these cutters was not as effective for removing the catalyzing material 64 from the surfaces of the diamond crystals 60 as the process of curve "A". Therefore, it was not until most of the catalyzing material 64 was removed from the interstices 62 to a depth of about 0.2 mm that the wear rate improved to that of curve "A".

Its believed that thermal degradation relating to wear rates as shown in curve "C" of FIG. 10 can be engineered into PCD elements 2 where it is beneficial. For example, it may be desirable to have edges of curved cutting elements 10 remote from the center of contact to wear more quickly than the center point. This would tend to preserve the curved shape of the cutting element, rather than having it become a flat surface.

Improved thermal degradation resistance improves wear rates because diamond is an extremely good thermal conductor. If a friction event at working surface 4, 70, 72 caused a sudden, extreme heat input, the bonded diamond crystals would conduct the heat in all directions away from the event. This would permit an extremely high temperature gradient through the material, possibly 1000 C. per mm or higher. A gradient this steep would enable the working surface 4, 70, 72 to reach 950 C., and not cause significant thermal degradation if interstices 62 and the surfaces of the diamond crystals 62 adjacent to the working surface are substantially free of the catalyzing material 64 to a depth of just 0.2 mm from the source of the heat.

It should be apparent that the temperature gradient will vary depending upon the crystal 60 size and the amount of inter-crystal bonding. However, in field tests of cutting elements 10 for earth boring bits, removal of substantially all of the catalyzing material 64 from the interstices 62 to a distance D of about 0.2 mm to about 0.3 mm from a working surface 4, 70, 72 produced dramatic improvements in wear resistance, with a combination of a 40% increase in rate of penetration and a 40% improvement in wear resistance. The improvement in wear resistance indicates that the attrition of the diamond crystals 60 due to catalyzing material 64 induced thermal degradation was dramatically reduced. The rate of penetration increase is believed to be due to the ability of the cutter to remain "sharper" longer due to the increased wear resistance.

Figure 11B:
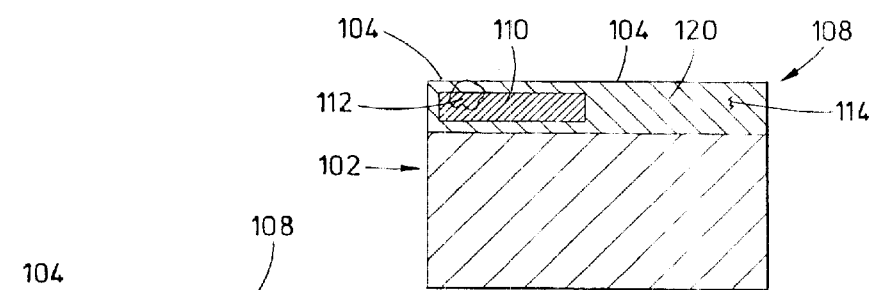
FIG. 11B is a section view of another encapsulated PCD embodiment of the PCD element of the present invention.
Figure 11A:
FIG. 11A is a front view of an encapsulated PCD embodiment of the PCD element of the present invention.
Figure 11C:
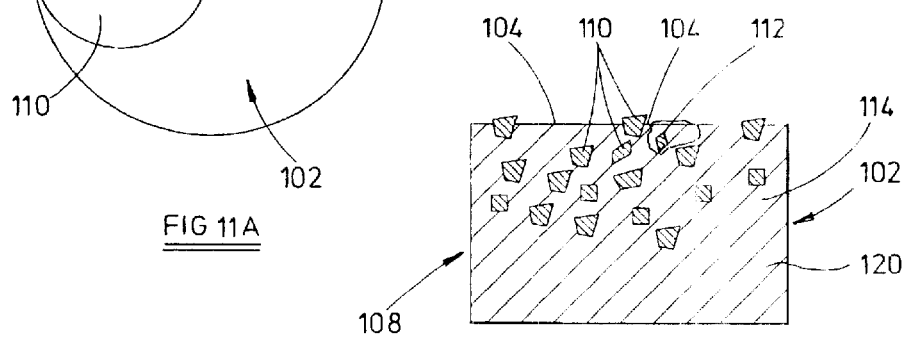
FIG. 11C is a section view of still another encapsulated PCD embodiment of the PCD element of the present invention.

There are other possible constructions of PCD elements that benefit from depletion or removal of the catalyzing material 64 as described above. As shown in FIGS. 11A, 11B and 11C another embodiment of the present invention is a compound PCD element 102. The PCD element 102 has a body 108 with a group VIII binder-catalyzing material with a second preformed PCD element 110 embedded within it. The embedded PCD element 110 may be flush with the working surface 104 of the encapsulating PCD element 120 as shown in FIG. 11A, or it may be embedded wholly within the encapsulating PCD element 120 as shown in FIG. 11B. This embedded PCD element 110 is made in a process using powdery carbonates of Mg, Ca, Sr, and Ba as the binder-catalyzing material, and is formed into a compound PCD element as described in the commonly assigned U.S. patent application Ser. No. 09/390,074, now U.S. Pat. No. 6,248, 447, herein incorporated by reference.

In this embodiment, since the embedded preformed PCD element 110 is formed at higher pressures, the diamond density may be made higher than that of the encapsulating PCD element 120. In this construction since the embedded PCD element 110 has a catalyzing material with a higher activation temperature, it may for example, be beneficial to deplete the catalyzing material only in the working surface of the encapsulating PCD element 120. Furthermore, the embedded PCD element 110 may be positioned within the encapsulating PCD element 120 to take advantage of the higher impact resistance of the embedded PCD element 110 combined with the improved wear resistance of the encapsulating element 120.

As shown in FIGS. 9, 11A, 11B, and 11C, the element 102 has a plurality of partially bonded diamond crystals 60, a catalyzing material 64 and a body 108 with a working surface 104. The volume 112 of the body adjacent the working surface 104 has a substantially higher diamond density than elsewhere 114 in the body 108, and the volume 112 is substantially free of the catalyzing material 64.

Several embedded PCD elements 110 may be arranged in the compound element 100, as shown in FIG. 11C, in a manner where the best of both impact resistance and improved wear resistance may be realized.

It may be desirable to deplete the catalyzing material in the embedded PCD element 110 as well as the catalyzing material of the encapsulating PDC element 120. This combination would provide an element with the highest possible impact strength combined with the highest possible wear resistance available in diamond elements for commercial use.

Figures 12A, 12B:
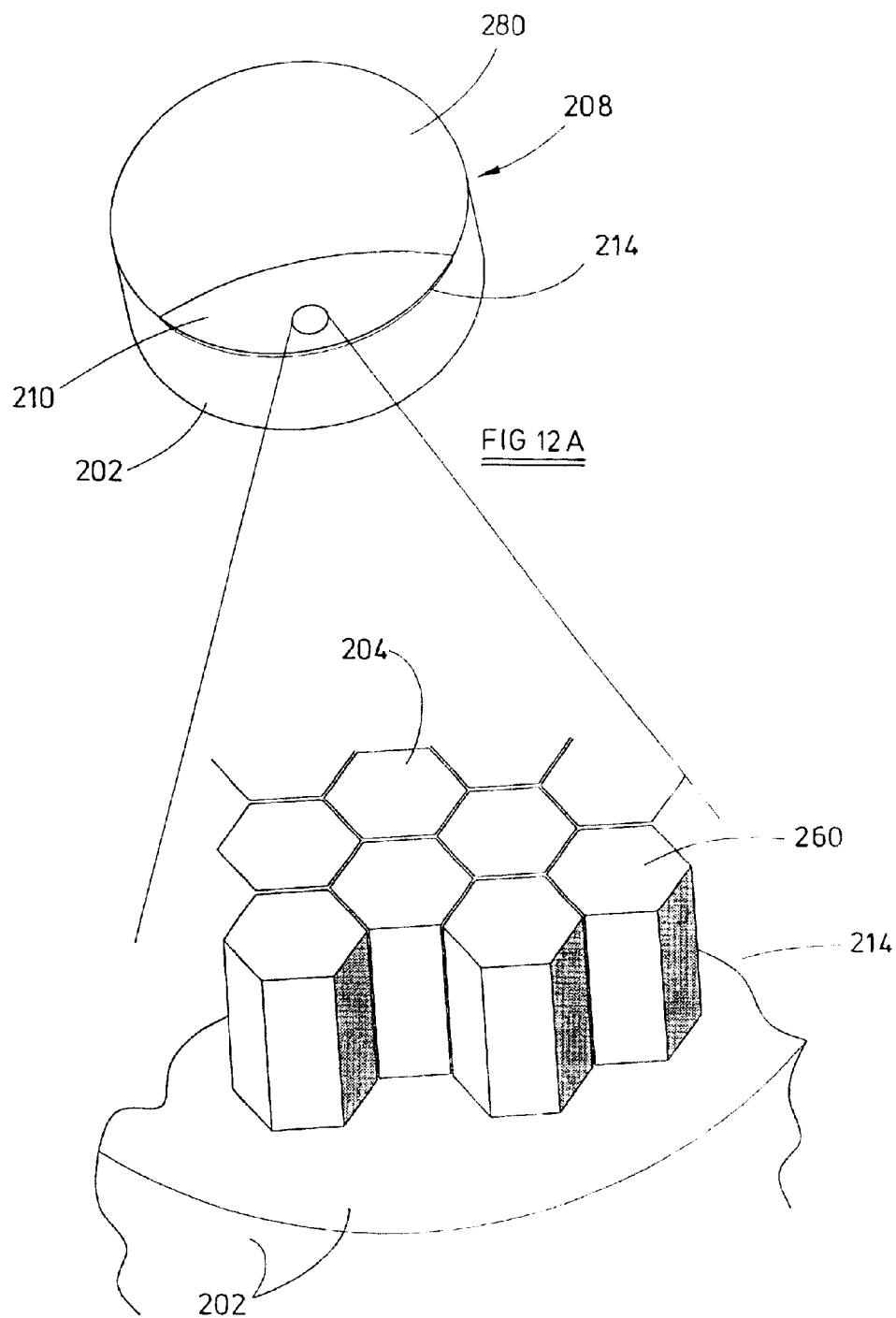
FIG. 12A is perspective view of a CVD/PVD applied surface for another embodiment of the PCD element of the present invention.
FIG. 12B is an enlarged perspective view of the crystal structure of the embodiment of the PCD element of the present invention shown in FIG. 12A.

In FIGS. 12A and 12B another embodiment of the PCD element 202 of the present invention is shown. In this embodiment, the PCD element 202 is first formed in the manner of the prior art. After a surface has been prepared, a CVD or PVD process is used to provide a closely packed set of epitaxially oriented crystals of diamond 260 deposited upon a future working surface 204 on a portion 210 of the PCD element 202. The assembly is then subjected to a high-pressure high temperature process whereby the deposited diamond crystals 260 form diamond to diamond bonds with each other, and to the diamond crystals in the parent PCD. This diamond-to-diamond bonding is possible due to the presence of the catalyzing material 64 infusing from the surface of parent PCD element 202.

After cleanup, a portion of the working surface 204 is treated to deplete the catalyzing material 64 from the CVD or PVD deposited layer. The final product is a PCD element having one portion of a working surface 204 with a volume 214 much higher in diamond density than that of the other surfaces 280 of the PCD element 202. This region 214 of high diamond density is subsequently depleted of the catalyzing material 64. Portions of the other surfaces 280 of the PCD element 202 may be depleted of the binder catalyzing material as well.

In general the elements 102, 202 shown in FIGS. 11A, 11B, 11C, 12A, and 12B may be characterized as PCD element 102, 102 having a body 108, 208 with a working surface 104, 204. The diamond density adjacent the working surface 104, 204 is substantially higher than elsewhere in the body 108, 208, and is substantially free of the catalyzing material 64.

Figure 1B:
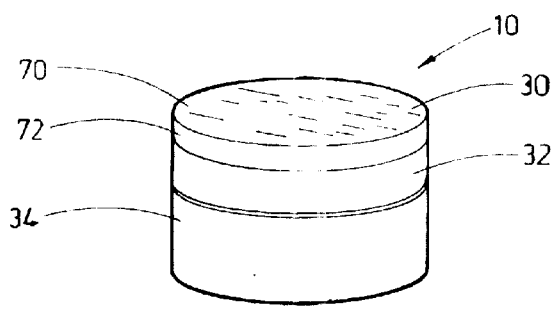
FIG. 1B is a typical PCD of the present invention shown as a cutting element.

One particularly useful application for the PCD element 2 of the present invention is as cutting elements 10, 50, 52 as shown in FIGS. 1B, 4 and 5. The working surface of the PCD cutting elements 10, 50, 52 may be a top working surface 70 and/or a peripheral working surface 72. The PCD cutting element 10 of FIG. 1B is one that may be typically used in fixed cutter type rotary drill bits 12, or for gauge protection in other types of downhole tools. The PCD cutting element 50 shown in FIG. 5 may be shaped as a dome 39. This type of PCD cutting element 50 has an extended base 51 for insertion into sockets in a rolling cutter drill bit 38 or in the body of both types of rotary drill bits, 12, 38 as will be described in detail.

The PCD cutting element 52 of FIG. 4 is adapted for use in a machining process. Although the configuration of the cutting element 52 in FIG. 4 is rectangular, it would be appreciated by those skilled in the art that this element could be triangular, quadrilateral or many other shapes suitable for machining highly abrasive products that are difficult to machine with conventional tools.

Figure 2:
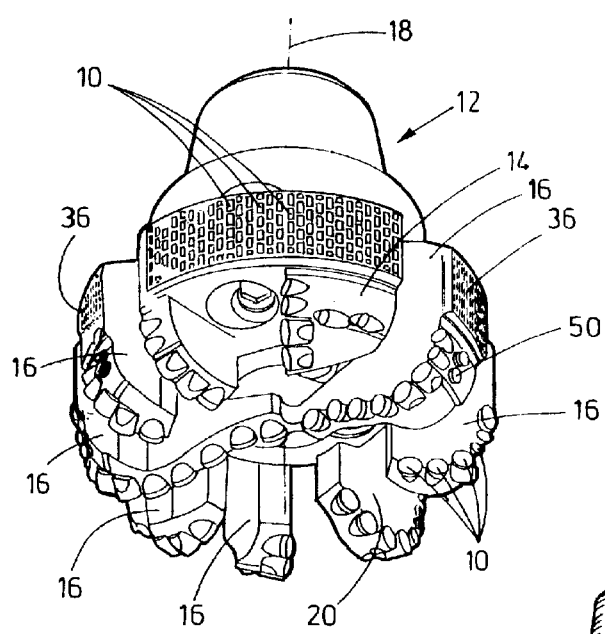
FIG. 2 is a side view of a fixed cutter rotary drill bit using a PCD element of the present invention.

The PCD cutting element 10 may be a preform cutting element 10 of a fixed cutter rotary drill bit 12 (as shown in FIG. 2). The bit body 14 of the drill bit is formed with a plurality of blades 16 extending generally outwardly away from the central longitudinal axis of rotation 18 of the drill bit. Spaced apart side-by-side along the leading face 20 of each blade is a plurality of the PCD cutting elements 10 of the present invention.

Typically, the PCD cutting element 10 has a body in the form of a circular tablet having a thin front facing table 30 of diamond or diamond-like (PCD) material, bonded in a high-pressure high-temperature press to a substrate 32 of less hard material such as cemented tungsten carbide. The cutting element 10 is preformed and then typically bonded on a generally cylindrical carrier 34 which is also formed from cemented tungsten carbide, or may alternatively be attached directly to the blade. The PCD cutting element 10 has working surfaces 70 and 72.

The cylindrical carrier 34 is received within a correspondingly shaped socket or recess in the blade 16. The carrier 34 will usually be brazed or shrink fit in the socket. In operation the fixed cutter drill bit 12 is rotated and weight is applied. This forces the cutting elements 10 into the earth being drilled, effecting a cutting and/or drilling action.

The PCD cutting elements 10 may also be applied to the gauge region 36 of the bit 12 to provide a gauge reaming action as well as protecting the bit 12 from excessive wear in the gauge region 36. In order to space these cutting elements 10 as closely as possible, it may be desirable to cut the elements into shapes, such as the rectangular shape shown, which more readily fit into the gauge region 36.

Figure 3:
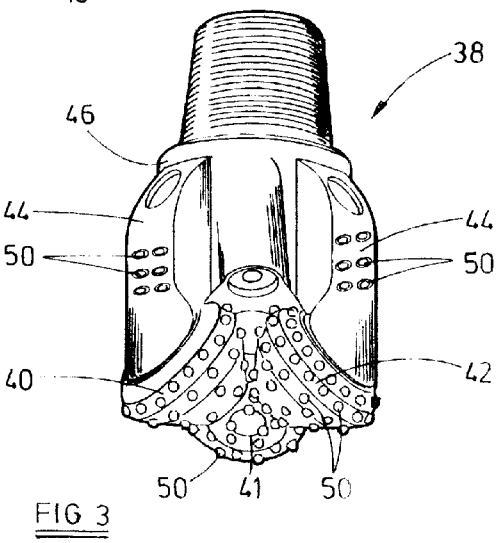
FIG. 3 is a perspective view of a rolling cutter rotary drill bit using a PCD element of the present invention.

In a second embodiment, the cutting element 50 (as shown in FIG. 5) of the present invention is on a rolling cutter type drill bit 38, shown in FIG. 3. A rolling cutter drill bit 38 typically has one or more truncated rolling cone cutters 40, 41, 42 assembled on a bearing spindle on the leg 44 of the bit body 46. The cutting elements 50 may be mounted as one or more of a plurality of cutting inserts arranged in rows on rolling cutters 40, 41, 42, or alternatively the PCD cutting elements 50 may be arranged along the leg 44 of the bit 38. The PCD cutting element 50 has a body in the form of a facing table 35 of diamond or diamond like material bonded to a less hard substrate 37. The facing table 35 in this embodiment of the present invention is in the form of a domed surface 39 and has working surfaces 70 and 72. Accordingly, there are often a number of transitional layers between the facing table 35 and the substrate 37 to help more evenly distribute the stresses generated during fabrication, as is well known to those skilled in the art.

In operation the rolling cutter drill bit 38 is rotated and weight is applied. This forces the cutting inserts 50 in the rows of the rolling cone cutters 40, 41, 42 into the earth, and as the bit 36 is rotated the rolling cutters 40, 41, 42 turn, effecting a drilling action.

In another embodiment, the PCD cutting element 52 of the present invention is in the form of a triangular, rectangular or other shaped material for use as a cutting insert in machining operations. In this embodiment, the cutting element 52 has a body in the form of a facing table 54 of diamond or diamond like material bonded to a less hard substrate 56 with working surfaces 70 and 72. Typically, the cutting element 52 would then be cut into a plurality of smaller pieces which are subsequently attached to an insert 58 that is mounted in the tool holder of a machine tool. The cutting element 52 may be attached to the insert by brazing, adhesives, welding, or clamping. It is also possible to finish form the cutting element 52 in the shape of the insert in a high-temperature high-pressure manufacturing process.

As shown in FIGS. 13–18, PCD elements 2, 102, 202 of the present invention may also be used for other applications such as hollow dies, shown for example as a wire drawing die, 300 of FIG. 13 utilizing a PCD element 302 of the present invention. It may also be desirable to utilize the excellent heat transfer capabilities of the PCD element 2, 102, 202 along with its electrical insulation properties as a heat sink 310 with a PCD element 312 of the present invention.

Figure 17A:
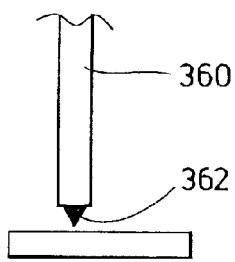
FIG. 17A is a side view of an indentor having a PCD element of the present invention.
Figure 17B:
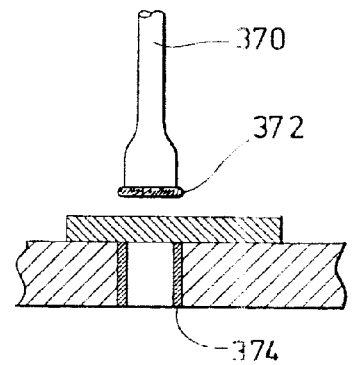
FIG. 17B is a partial section view of a punch having a PCD element of the present invention.
Figure 18:
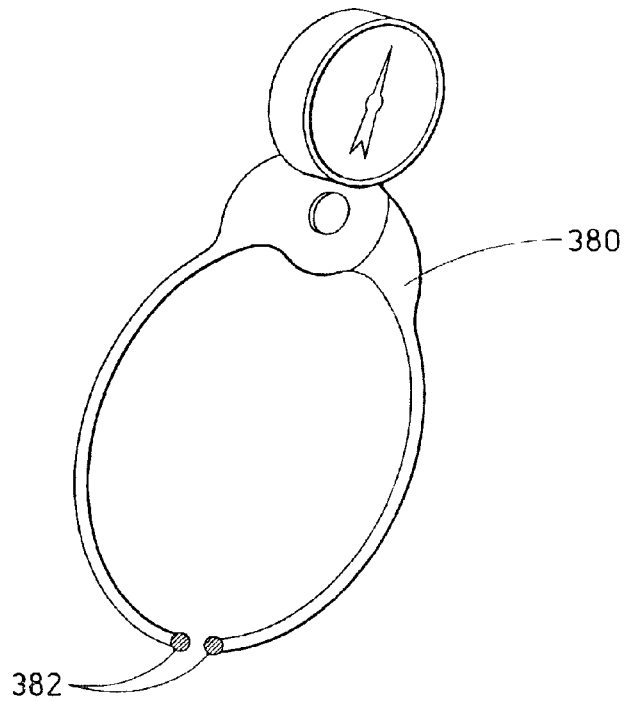
FIG. 18 is perspective view of a measuring device having a PCD element of the present invention.

Other applications include friction bearings 320 with a PCD bearing element 322 shown in FIG. 15 and the mating parts of a valve 340, 344 with surfaces 342 having a PCD element 342 of the present invention as shown in FIGS. 16A and 16B. In addition, indentors 360 for scribes, hardness testers, surface roughening, etc. may have PCD elements 362 of the present invention as shown in FIG. 17A. Punches 370 may have either or both dies 372, 374 made of the PCD material of the present invention, as shown in FIG. 17B. Also, tool mandrels 382 and other types of wear elements for measuring devices 380, shown in FIG. 18 may be made of PCD elements of the present inventions. It should be understood that almost every application for polycrystalline diamond would benefit from the catalyzing material depleted PCD elements of the present invention.

Whereas the present invention has been described in particular relation to the drawings attached hereto, it should be understood that other and further modifications apart from those shown or suggested herein, may be made within the scope and spirit of the present invention.

What is claimed is:

1. An earth boring drill bit comprising a bit body and at least one polycrystalline diamond element, the polycrystalline diamond element comprising bonded diamond crystals and a catalyzing material, a working surface on the polycrystalline diamond element, wherein a first volume of the bonded diamond crystals remote from the working surface contains the catalyzing material and a second volume of the bonded diamond crystals adjacent to the working surface is substantially free of the catalyzing material to a depth of at least about 0.1 mm from the working surface.

2. The earth boring drill bit of claim 1, wherein the catalyzing material remaining in the second volume increases with distance from the working surface.

3. The earth boring drill bit of claim 2, wherein the polycrystalline diamond element is mounted upon the bit body of a fixed cutter drill bit.

4. The earth boring drill bit of claim 3, wherein the bit body is formed with a plurality of blades extending generally outwardly away from a central longitudinal axis of rotation of the drill bit, and wherein a plurality of the polycrystalline diamond elements are spaced apart side-by-side along a leading face of at least one of the plurality of blades.

5. The earth boring drill bit of claim 4, wherein the plurality of the polycrystalline diamond elements are preformed and bonded upon a generally cylindrical carrier.

6. The earth boring drill bit of claim 5, wherein the cylindrical carrier is formed of cemented tungsten carbide.

7. The earth boring drill bit of claim 3, wherein the bit body is formed with a gauge region and wherein the polycrystalline diamond element is a borehole gauge reaming element.

8. The earth boring drill bit of claim 7, wherein the polycrystalline diamond element is preformed and bonded upon a generally cylindrical carrier.

9. The earth boring drill bit of claim 8, wherein the cylindrical carrier is formed of cemented tungsten carbide.

10. The earth boring drill bit of claim 3, wherein the bit body is formed with a gauge region and wherein the polycrystalline diamond element is mounted in the gauge region so as to protect the drill bit from excessive wear.

11. The earth boring drill bit of claim 10, wherein the polycrystalline diamond element is preformed and bonded upon a generally cylindrical carrier.

12. The earth boring drill bit of claim 11, wherein the cylindrical carrier is formed of cemented tungsten carbide.

13. The earth boring drill bit of claim 2, wherein the polycrystalline diamond element is mounted upon the bit body of a rolling cutter drill bit.

14. The earth boring drill bit of claim 13 wherein the bit body comprises a plurality of legs, a bearing spindle formed on each leg, and a rolling cone cutter mounted on each bearing spindle, and wherein the polycrystalline diamond element is mounted as one or more of a plurality of inserts arranged in rows on the rolling cone cutter.

15. The earth boring drill bit of claim 14 wherein the working surface of the polycrystalline diamond element forms a facing table in the form of a domed surface.

16. The earth boring drill bit of claim 15 wherein the polycrystalline diamond element is bonded to a substrate.

17. The earth boring drill bit of claim 16 further comprising one or more transitional layers between the facing table and the substrate.

18. The earth boring drill bit of claim 13 wherein the bit body comprises a plurality of legs, and wherein the polycrystalline diamond element is arranged along at least one of the legs of the drill bit.

19. The earth boring drill bit of claim 18 wherein the working surface of the polycrystalline diamond element forms a facing table in the form of a domed surface.

20. The earth boring drill bit of claim 19 wherein the polycrystalline diamond element is bonded to a substrate.

21. The earth boring drill bit of claim 20 further comprising one or more transitional layers between the facing table and the substrate.

22. An earth boring drill bit comprising a bit body and at least one preform polycrystalline diamond element formed with a substrate of less hard material, the polycrystalline diamond element comprising bonded diamond crystals, an interstitial matrix, and a catalyzing material within the interstitial matrix, a working surface on the polycrystalline diamond element, wherein a first volume of the bonded diamond crystals remote from the working surface contains the catalyzing material and a second volume of the bonded diamond crystals adjacent to the working surface is substantially free of the catalyzing material to a depth of at least 0.1 mm from the working surface.

23. The earth boring drill bit of claim 22, wherein the catalyzing material remaining in the second volume increases with distance from the working surface.

24. The earth boring drill bit of claim 23, wherein the polycrystalline diamond element is mounted upon the bit body of a fixed cutter drill bit.

25. The earth boring drill bit of claim 24, wherein the bit body is formed with a plurality of blades extending generally outwardly away from a central longitudinal axis of rotation of the drill bit, and wherein a plurality of the polycrystalline diamond elements are spaced apart side-by-side along a leading face of at least one of the plurality of blades.

26. The earth boring drill bit of claim 25, wherein the plurality of the polycrystalline diamond elements are bonded to a generally cylindrical carrier.

27. The earth boring drill bit of claim 26, wherein the cylindrical carrier is formed of cemented tungsten carbide.

28. The earth boring drill bit of claim 24, wherein the bit body is formed with a gauge region and wherein the polycrystalline diamond element is a gauge reaming element.

29. The earth boring drill bit of claim 28, wherein the polycrystalline diamond element is bonded to a generally cylindrical carrier.

30. The earth boring drill bit of claim 29, wherein the cylindrical carrier is formed of cemented tungsten carbide.

31. The earth boring drill bit of claim 24, wherein the bit body is formed with a gauge region and wherein the polycrystalline diamond element is mounted in the gauge region so as to protect the drill bit from excessive wear.

32. The earth boring drill bit of claim 31, wherein the polycrystalline diamond element is bonded to a generally cylindrical carrier.

33. The earth boring drill bit of claim 32, wherein the cylindrical carrier is formed of cemented tungsten carbide.

34. The earth boring drill bit of claim 23, wherein the polycrystalline diamond element is mounted upon the bit body of a rolling cutter drill bit.

35. The earth boring drill bit of claim 34 wherein the bit body comprises a plurality of legs, a bearing spindle formed on each leg, and a rolling cone cutter mounted on each bearing spindle, and wherein the polycrystalline diamond element is mounted as one or more of a plurality of inserts arranged in rows on the rolling cone cutter.

36. The earth boring drill bit of claim 35 wherein the working surface of the polycrystalline diamond element forms a facing table in the form of a domed surface.

37. The earth boring drill bit of claim 36 further comprising one or more transitional layers between the facing table and the substrate.

38. The earth boring drill bit of claim 34 wherein the bit body comprises a plurality of legs, and wherein the polycrystalline diamond element is arranged along at least one of the legs of the drill bit.

39. The earth boring drill bit of claim 38 wherein the working surface of the polycrystalline diamond element forms a facing table in the form of a domed surface.

40. The earth boring drill bit of claim 39 further comprising one or more transitional layers between the facing table and the substrate.

* * * * *